Dec. 8, 1953
I. STERN
2,661,621
LOCKING MEANS FOR DOORS, IN PARTICULAR
FOR AUTOMOTIVE VEHICLES
Filed Feb. 21, 1950
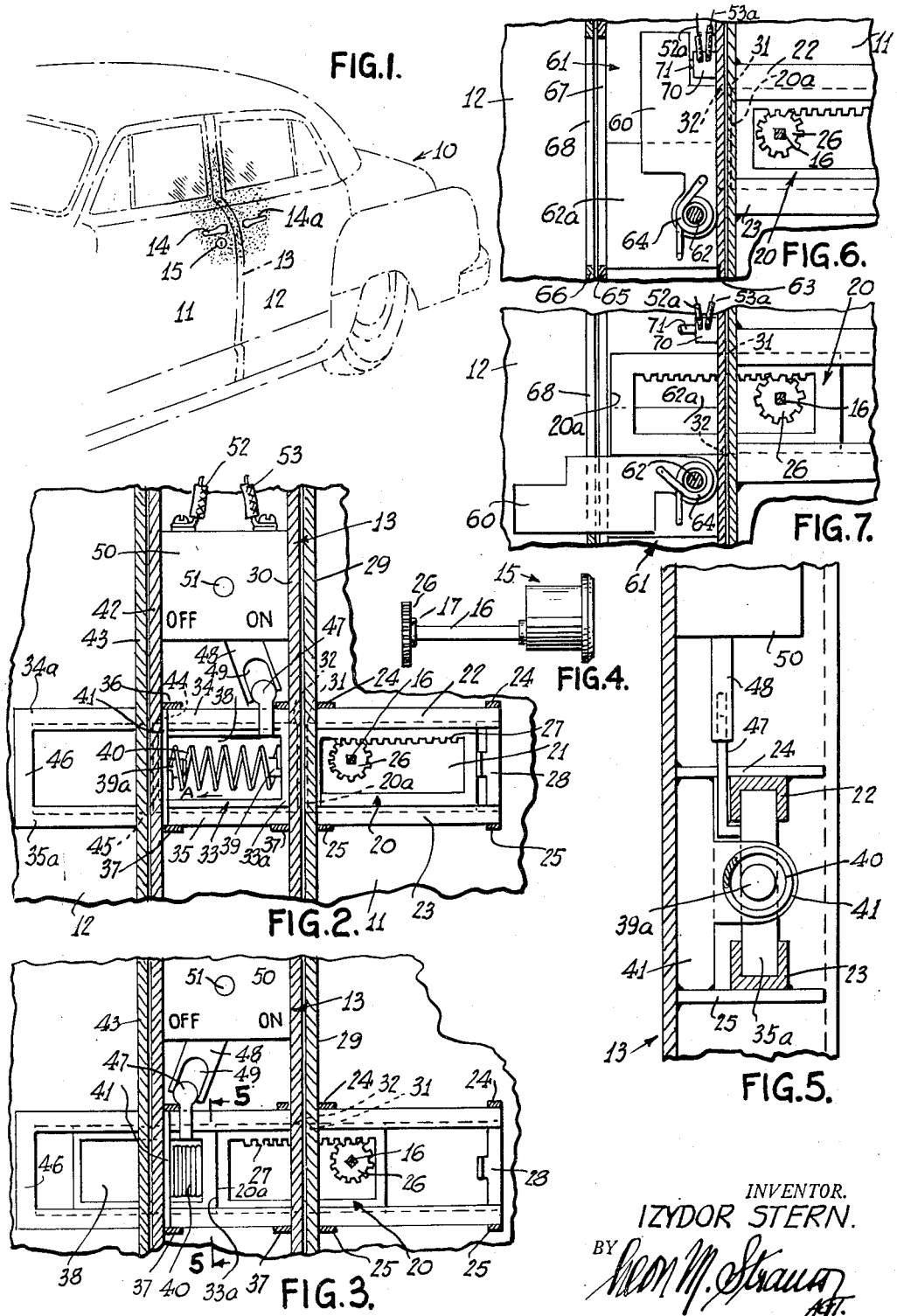
INVENTOR.
IZYDOR STERN.

Patented Dec. 8, 1953

2,661,621

UNITED STATES PATENT OFFICE 2,661,621

LOCKING MEANS FOR DOORS, IN PARTICULAR FOR AUTOMOTIVE VEHICLES

Izydor Stern, Antwerp, Belgium

Application February 21, 1950, Serial No. 145,409

1 Claim. (Cl. 70—255)

This invention relates to locking systems, and more particularly to lock structures for use in connection with automotive and other vehicles.

It is one of the objects of the present invention to provide means facilitating inexpensive manufacture of the lock structure through mass production methods, as by stamping, whereby the parts of the lock may be kept relatively simple in shape resulting in a compact construction and can be easily and readily assembled for application to and accommodation in the door or body of the vehicle.

It is another object of the invention to provide means ensuring arrangement of the lock parts so that they do not become easily accessible to thereby increase safety of the vehicle against theft and manipulation of the lock by unauthorized persons.

It is still another object of the present invention to provide means affording positive operation of the lock assembly which can be applied to a single as well as to two adjacent doors of a vehicle, in which latter case only one of the doors will be equipped with a key-controlled lock for simultaneous actuation of the lock assembly extending to both doors of the vehicle.

Yet a further object of the present invention is to provide means controlling the lock mechanisms for both the front door and the rear door of a car or like vehicle.

Still a further object of the present invention is to provide means rendering possible connection of the lock with the ignition system to thereby increase safety measures for the car against theft or forced opening of the door or doors of the car.

Yet another object of the present invention is the provision of means contributing to automatic movement of a plurality of locking bolts for operating the vehicle doors and independently of the door closing mechanism actuated by the knob or handle of the door.

Still another object of the invention is to provide means conducive to considerable improvements in or relating to the safety of a car or similar vehicle against theft, whereby even after the window of the vehicle door is forced open by breaking, the latter cannot be unlocked and opened in the conventional manner by actuating the door handle from within the vehicle.

A still further object of the invention is to provide means resulting in an advantageous coupling of the parts of the lock structure, which is extremely compact, takes up very little space and is very efficient and secure in function and operation, the lock structure being preferably combined with a cylinder lock of known construction employing a key for operation thereof.

With the above and other objects in view, the invention will be hereinafter more fully described and the combination and arrangement of parts will be shown in the accompanying drawing and pointed out in the claim which forms parts of the specification.

In the drawing:

Fig. 1 shows in phantom lines and in perspective a portion of an automobile equipped with a lock made in accordance with this invention;

Fig. 2 is a detail view of a lock in inoperative position with the outer wall of the door and the door post cut away;

Fig. 3 is a view similar to that of Fig. 2 but with the lock in operative position;

Fig. 4 is a detail view of a cylinder lock with a shaft extension and gear;

Fig. 5 is an enlarged sectional view taken along line 5—5 of Fig. 3;

Fig. 6 is a fragmentary view of a lock embodying the invention in a modified form and seen in inoperative position, parts of the door and door post being broken away;

Fig. 7 is a view similar to that of Fig. 6 with the lock in operative or locked position.

Referring now more particularly to the drawing, there is shown in Fig. 1 an automobile 10 having front door 11 and rear door 12, separated by a door post 13. Front door 11 can be locked by means of a cylinder lock 15 positioned below the handle 14.

As can be seen from Figs. 2 and 4, front door 11 accommodates a slide member 20 which has a cut-out 21 which is slidably guided along tracks 22, 23. The tracks 22, 23 are held in position by pairs of stays 24, 25 to which the tracks 22, 23 are affixed as by welding.

Within the cut-out 21 of slide member 20, there is accommodated a pinion 26 which is secured to a shaft extension 16 extending from cylinder lock 15 a predetermined distance whereby pinion 26 may be affixed to shaft 16, as by a clamping collar 17. Thus, it is possible to adjust pinion 26 along shaft 16 in accordance with the depth of the door. Slide member 20 is provided with a rack 27 with which pinion 26 is in meshing engagement. At the end of tracks 22, 23 there is a back stop 28 which may be adjustably fixed at one end of said tracks 22, 23 (Figs. 2, 3), in order to control the extent of movement of slide member 20 within door 11.

In the wall 29 of door 11 and wall 30 of post 13 there extend registering slots 31, 32 through which slide member 20 may pass when pinion 26 is operated from cylinder lock 15 to drive slide 20 along its tracks 22, 23 into operative or locked position, in which the forward end 20a of the slide member 20 extends into the hollow post 13.

When slide 20 is moved into such position, it abuts against an associate slide member 33 having the adjacent edge 33a. Slide member 33 is also slidably supported in tracks 34, 35 attached to pairs of stays 36, 37 in a way similar to pairs of stays 24, 25. Within cut-out 38 of slide 33 and attached to a stud 39 is a spring member 40 which is compressible upon movement of slide 33 in the direction of arrow A against a fixed bracket 41 placed at the end of slide 33. Fig. 3 shows spring 40 in such compressed position.

Between wall 42 of door post 13 and wall 43 of rear door 12 there are arranged registering slots 44, 45 in alignment with slots 31, 32. As can be further seen from Fig. 2, slide 33 is guided along extension tracks 34a, 35a which form a continuation of tracks 34, 35. Prolonged tracks 34a, 35a are interconnected by a cross piece 46 which props and supports tracks 34a, 35a.

In the embodiment shown in Figs. 2 and 3, further provision is made to connect slide 33 through a finger 47 with a switch 50 by means of a switch arm 48 provided with a slotted guide 49. Switch arm 48 is pivoted at 51. Switch 50 is connected with conductors 52, 53 to the wiring system of the ignition of the automobile whereby the ignition will be automatically made inoperative upon operation of the lock structure to operative or locked position (Fig. 3).

Thus, it will become apparent that in the event that one of the door windows would be forced open with the intention of stealing the car, the ignition system could not be actuated, even when using the ignition key, as the door is in locked position by means of the slide arrangement 20—30 (Fig. 3). This locked position can only be released by actuating the cylinder lock 15 and not by operating the handle or other conventional locking devices from within the car.

It will be self-evident that when turning a key (not shown) one entire revolution in the cylinder lock 15, the pinion 26 will guide slide 20 back to its initial position (Fig. 2) while slide 33 follows slide 20 under the action of spring 40. Simultaneously, the switch arrangement 47—53 will also be released to starting position whereby spring 40 is so calculated as to its tension that slide 33 as well as switch 50 assume their initial positions, respectively.

Figs. 6 and 7 show another form of embodiment of the invention in which slide mechanism 20 and tracks 22, 23 are the same and function in like manner as hereinabove described with respect to Figs. 2, 3 and 5. Slide 20 passes to operative position through registering slots or passageways 31, 32, as hereinabove explained, whereby the forward edge 20a of the slide 20 comes to abut against a swingable bolt member 60, forming the follower.

This member is pivotally supported within post 61 of the car at 62. The pivot pin at 62 may be held in position by a bracket 62a extending between walls 63 and 65 of post 61 in any suitable manner and carries a spring member 64 wound around pivot pin 62 so as to hold bolt 60 normally in upright or inoperative position, as indicated in Fig. 6.

Wall 65 of post 61 and wall 66 of door 12 are provided with registering openings or passageways 67, 68, respectively, for the purpose of accommodating therein bolt 60 when the same is moved by slide 20 to its operative position, in which bolt 60 extends through hollow post 61 into a suitable space in door 12 (Fig. 7). It will thus become apparent that upon actuation of the cylinder lock 15 and its associated parts including pinion 26, slide 20 may be readily and positively guided back to its starting position whereby spring 64 will force bolt 60 to change its horizontal position (Fig. 7) to its upright position (Fig. 6). This construction has the particular advantage that bolt or latch 60 may be made of any length and can be readily adjusted to the particular type of doors used.

As has been further indicated in Fig. 6, bolt 60 when in upright position, is urged against pin 71 to close the contacts (not shown) within contact box 70 from which conductors 52a, 53a lead to the ignition wiring of the car. If bolt 60 is moved into locked position (Fig. 7) the spring supported contact pin 71 is forced away from the contacts within contact box 70 and, thus interrupts the circuit leading to the ignition system from conductors 52a, 53a. The result of this operation of the lock is practically the same as hereinabove described with respect to Figs. 2 and 3.

If, as is the case in other constructions, handle 14a of the rear door of the vehicle is disposed at the far end of the door 12, it will be readily understood that bolt 60 may be somewhat extended so as to positively prevent door 12 from being opened while lock slide 20 is in operative or locked position.

It is to be noted that while the door lock 15 extends from the outside surface of the door into the latter and terminates with its shaft 16 short of the inside surface of said door, this door lock cannot be actuated from the inside of the door, as it is now conventional, but only from the outside of the door by means of a key fitting said cylinder lock.

It is further to be noted that the slide 20 and follower 33 or slide 20 and follower 60, as the case may be, are arranged for movement substantially in a plane extending at right angle to the shaft 16 of the cylinder lock which shaft is suitably supported (not shown) within the interior of the door. Since parts of the slide mechanism, namely, slide 20, follower 33 or bolt follower 60, may be more or less of the same shape and material and stamped out from metal plates, they do not require much space within the hollow of the doors or door post. Thus, the door lock structure is very compact, is not conspicuous from the outside and is very effective whether applied to a single door with door post or to a plurality of doors with a door post therebetween.

It can thus be seen that there has been provided, in accordance with this invention, a lock structure for automotive vehicles having adjacent doors and a door post therebetween; comprising, in combination, a cylinder lock, a shaft associated with said cylinder lock and operable by the latter, registering passageways provided in said doors and said door post, respectively, first means on said shaft, and a slide mechanism including second means cooperable with said first means, whereby said slide mechanism may be displaced by said first means through said second means to extend through said passageways for locking purposes, said slide mechanism comprising two substantially flat stamping metal slides of which one is spring-supported, the other of said slides being associated with said second means.

Although the invention has been described with reference to certain specific embodiments thereof, it is to be noted that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

A lock structure for automotive vehicles having at least one door and a door post therefor; comprising, in combination, a key-controlled cylinder lock, a shaft extending from said cylinder lock and operatively connected to the latter, a pinion on said shaft, a slide mechanism arranged for movement by said pinion, registering passageways provided in said door and said door post, respectively, whereby said slide mechanism may be actuated by said pinion to extend through said passageways of said door and said door post to lock said door to said post, said slide mechanism including a slide member having a cut-out, a rack forming a wall of said cut-out and positively engaging said pinion, a spring-supported displaceable follower in the path of said slide member and cooperable with the latter, switch means actuatable by displacement of said follower and arranged in said door post, said switch means including conductor means connected to the ignition circuit of said vehicle track means disposed within said door and within said door post for guiding said slide, and stop means adjustably associated with said track means within said door to limit the extent of movement of said slide along said track means.

IZYDOR STERN.

References Cited in the file of this patent

UNITED STATES PATENTS

| Number | Name | Date |
| --- | --- | --- |
| 830,624 | Townsend | Sept. 11, 1906 |
| 1,448,983 | Wekerle | Mar. 20, 1923 |
| 1,653,567 | Hershey | Dec. 20, 1927 |
| 1,700,129 | Hausmann | Jan. 29, 1929 |
| 1,985,363 | Courtney | Dec. 25, 1934 |
| 2,023,437 | Ralston | Dec. 10, 1935 |
| 2,043,608 | Dalziel et al. | June 9, 1936 |
| 2,107,737 | Irwin | Feb. 8, 1938 |
| 2,283,596 | Barbour | May 19, 1942 |
| 2,366,391 | Dodge | Jan. 2, 1945 |

FOREIGN PATENTS

| Number | Country | Date |
| --- | --- | --- |
| 718,648 | France | Nov. 5, 1931 |